US012587462B2

(12) United States Patent
Terry et al.

(10) Patent No.: US 12,587,462 B2
(45) Date of Patent: Mar. 24, 2026

(54) NETWORKING DATA COLLECTION IN 5G NETWORK FUNCTIONS FOR ZOOMING USING MACHINE LEARNING

(71) Applicant: Microsoft Technology Licensing, LLC, Redmond, WA (US)

(72) Inventors: Jason Terry, Acton, MA (US); Sumit Maheshwari, Westford, MA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 15 days.

(21) Appl. No.: 18/636,067

(22) Filed: Apr. 15, 2024

(65) Prior Publication Data

US 2025/0323856 A1 Oct. 16, 2025

(51) Int. Cl.
| | |
|---|---|
| *H04L 29/06* | (2006.01) |
| *H04L 43/08* | (2022.01) |
| *H04L 43/20* | (2022.01) |
| *G06F 17/30* | (2006.01) |

(52) U.S. Cl.
CPC .............. *H04L 43/20* (2022.05); *H04L 43/08* (2013.01)

(58) Field of Classification Search
CPC ......... H04L 43/20; H04L 43/08; H04L 29/06; H04L 63/1425; H04L 63/1416; G06F 17/30
USPC ........................................................ 709/224
See application file for complete search history.

(56) References Cited

U.S. PATENT DOCUMENTS

| | | | | |
|---|---|---|---|---|
| 2015/0358205 A1* | 12/2015 | Brophy | ............... | H04L 63/1416 709/224 |
| 2016/0080233 A1* | 3/2016 | Reynolds | ............ | H04L 43/0876 709/224 |
| 2017/0063909 A1* | 3/2017 | Muddu | ................. | G06F 3/0484 |
| 2024/0028499 A1* | 1/2024 | Amador | .............. | G06F 11/3684 |

OTHER PUBLICATIONS

Google Scholar search (Year: 2025).*

* cited by examiner

*Primary Examiner* — Jude Jean Gilles
(74) *Attorney, Agent, or Firm* — ArentFox Schiff LLP

(57) ABSTRACT

A system, method, and computer-readable media for analyzing network traffic in a communications network are provided. A network analyzer collects a subset of module-level statistics from a plurality of network functions (NFs) within the network. The network analyzer analyzes the module-level statistics to identify a deviation from a normal state of operation. The network analyzer identifies a network stage where a network issue causes the deviation using a machine learning model trained on features associated with the deviation. The network analyzer provides suggestions for debugging, optimizing, or testing the network issue based on the deviation and the identified network stage. The network analyzer can collect additional module-level statistics or packet-level statistics at the identified network stage based on the deviation, confirm the network issue based on the additional module-level statistics or packet-level statistics, and take corrective action to an NF at the network stage to address the network issue.

18 Claims, 8 Drawing Sheets

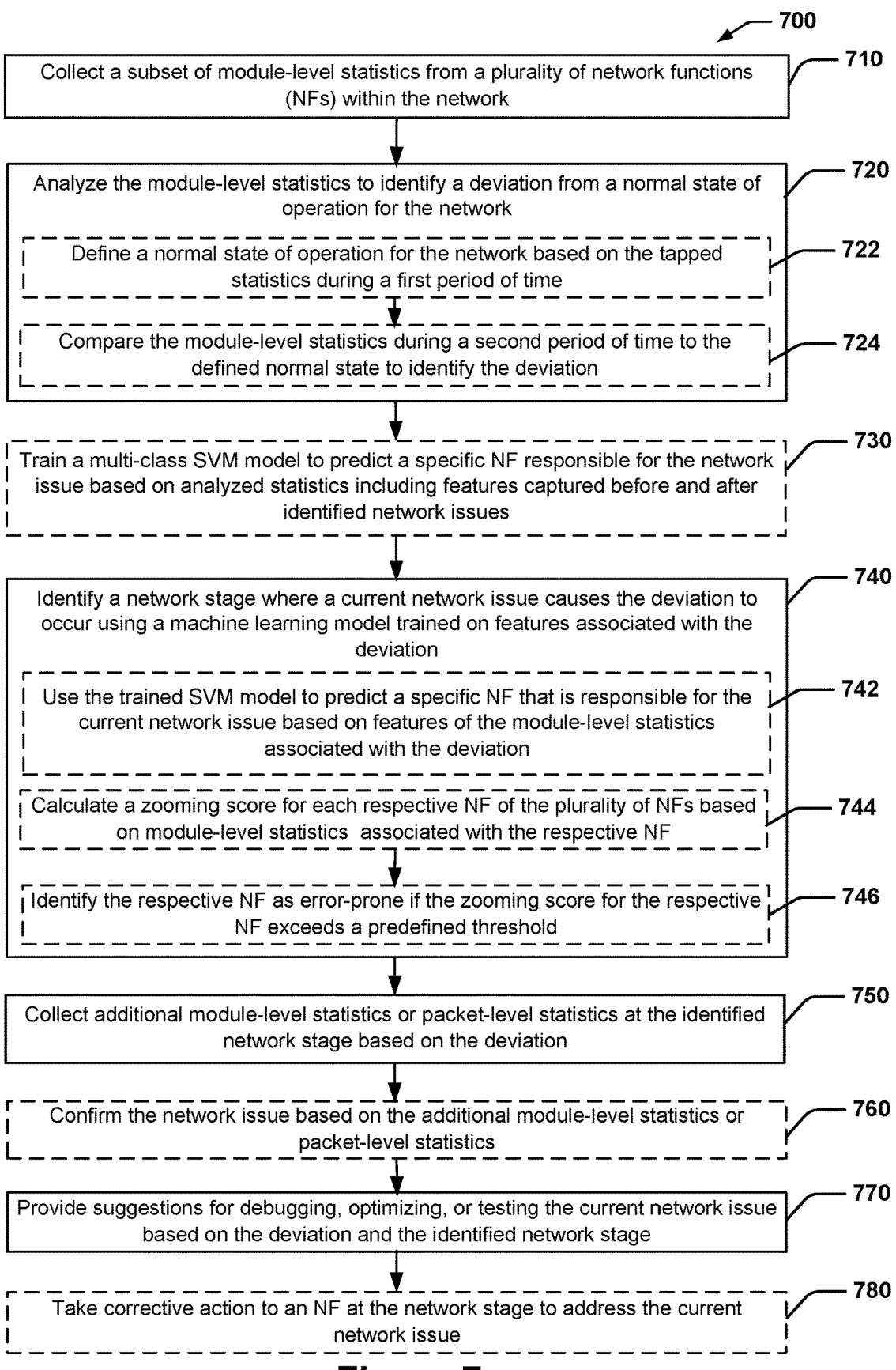

700

Collect a subset of module-level statistics from a plurality of network functions (NFs) within the network — 710

Analyze the module-level statistics to identify a deviation from a normal state of operation for the network — 720

Define a normal state of operation for the network based on the tapped statistics during a first period of time — 722

Compare the module-level statistics during a second period of time to the defined normal state to identify the deviation — 724

Train a multi-class SVM model to predict a specific NF responsible for the network issue based on analyzed statistics including features captured before and after identified network issues — 730

Identify a network stage where a current network issue causes the deviation to occur using a machine learning model trained on features associated with the deviation — 740

Use the trained SVM model to predict a specific NF that is responsible for the current network issue based on features of the module-level statistics associated with the deviation — 742

Calculate a zooming score for each respective NF of the plurality of NFs based on module-level statistics associated with the respective NF — 744

Identify the respective NF as error-prone if the zooming score for the respective NF exceeds a predefined threshold — 746

Collect additional module-level statistics or packet-level statistics at the identified network stage based on the deviation — 750

Confirm the network issue based on the additional module-level statistics or packet-level statistics — 760

Provide suggestions for debugging, optimizing, or testing the current network issue based on the deviation and the identified network stage — 770

Take corrective action to an NF at the network stage to address the current network issue — 780

Figure 7

NETWORKING DATA COLLECTION IN 5G NETWORK FUNCTIONS FOR ZOOMING USING MACHINE LEARNING

BACKGROUND

A radio access network (RAN) may provide multiple user devices with wireless access to a network. The user devices may wirelessly communicate with a base station, which forwards the communications towards a core network. Conventionally, a base station in the RAN is implemented by dedicated processing hardware (e.g., an embedded system) located close to a radio unit including antennas. The base station may perform lower layer processing including physical (PHY) layer and media access control (MAC) layer processing for one or more cells. There may be costs associated with deploying dedicated processing hardware for each base station in a RAN, particularly for a RAN including small cells with relatively small coverage areas. Additionally, the dedicated processing hardware may be a single point of failure for the cell.

A virtualized radio access network may utilize an edge data center with generic computing resources for performing RAN processing for one or more cells. That is, instead of performing PHY and MAC layer processing locally on dedicated hardware, a virtualized radio access network may forward radio signals from the radio units to the edge data center for processing and similarly forward signals from the edge data center to the radio units for wireless transmission. In one specific example, cloud-computing environments can be used to provide mobile edge computing (MEC) where certain functions of a mobile network can be provided as workloads on nodes in the cloud-computing environment. In MEC, a centralized unit (CU) can be implemented in a back-end node, one or more distributed units (DUs) can be implemented in intermediate nodes, and various remote units (RU), which can provide at least PHY and/or MAC layers of a base station or other RAN node of the mobile network, can be deployed at edge servers. The RUs can communicate with the CU via one or more DUs. In an example, the DUs can provide higher network layer functionality for the RAN, such as radio link control (RLC) or packet data convergence protocol (PDCP) layer functions. The RUs can facilitate access to the CU for various downstream devices, such as user equipment (UE), Internet-of-Things (IoT) devices, etc.

Because the edge data center utilizes generic computing resources, a virtualized RAN may provide scalability and fault tolerance for base station processing. For example, the edge data center may assign a variable number of computing resources (e.g., servers) to perform PHY layer processing for the radio units associated with the edge data center based on a workload. Further, a virtualized RAN may implement multiple layers of RAN processing at a data center, enabling collection of multiple data feeds.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In some aspects, the techniques described herein relate to an apparatus for analyzing network traffic in a 5G network, including: one or more memories storing computer-executable instructions; and one or more processors configured to execute the instructions to: collect a subset of module-level statistics from a plurality of network functions (NFs) within the network; analyze the module-level statistics to identify a deviation from a normal state of operation for the network; identify a network stage where a current network issue causes the deviation to occur using a machine learning model trained on features associated with the deviation; collect additional module-level statistics or packet-level statistics at the identified network stage based on the deviation; and provide suggestions for debugging, optimizing, or testing the current network issue based on the deviation and the identified network stage.

In some aspects, the techniques described herein relate to a method for analyzing network traffic in a communications network, including: collecting a subset of module-level statistics from a plurality of network functions (NFs) within the network; analyzing the module-level statistics to identify a deviation from a normal state of operation for the network; identifying a network stage where a current network issue causes the deviation to occur using a machine learning model trained on features associated with the deviation; collecting additional module-level statistics or packet-level statistics at the identified network stage based on the deviation; and providing suggestions for debugging, optimizing, or testing the current network issue based on the deviation and the identified network stage.

In some aspects, the techniques described herein relate to a non-transitory computer-readable medium storing computer-executable code that when executed by one or more processors causes the one or more processors to: collect a subset of module-level statistics from a plurality of network functions (NFs) within the network; analyze the module-level statistics to identify a deviation from a normal state of operation for the network; identify a network stage where a current network issue causes the deviation to occur using a machine learning model trained on features associated with the deviation; collect additional module-level statistics or packet-level statistics at the identified network stage based on the deviation; and provide suggestions for debugging, optimizing, or testing the current network issue based on the deviation and the identified network stage.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 7 is a flow diagram of an example of a method for analyzing network traffic in a communications network.

DETAILED DESCRIPTION

Figure 1:
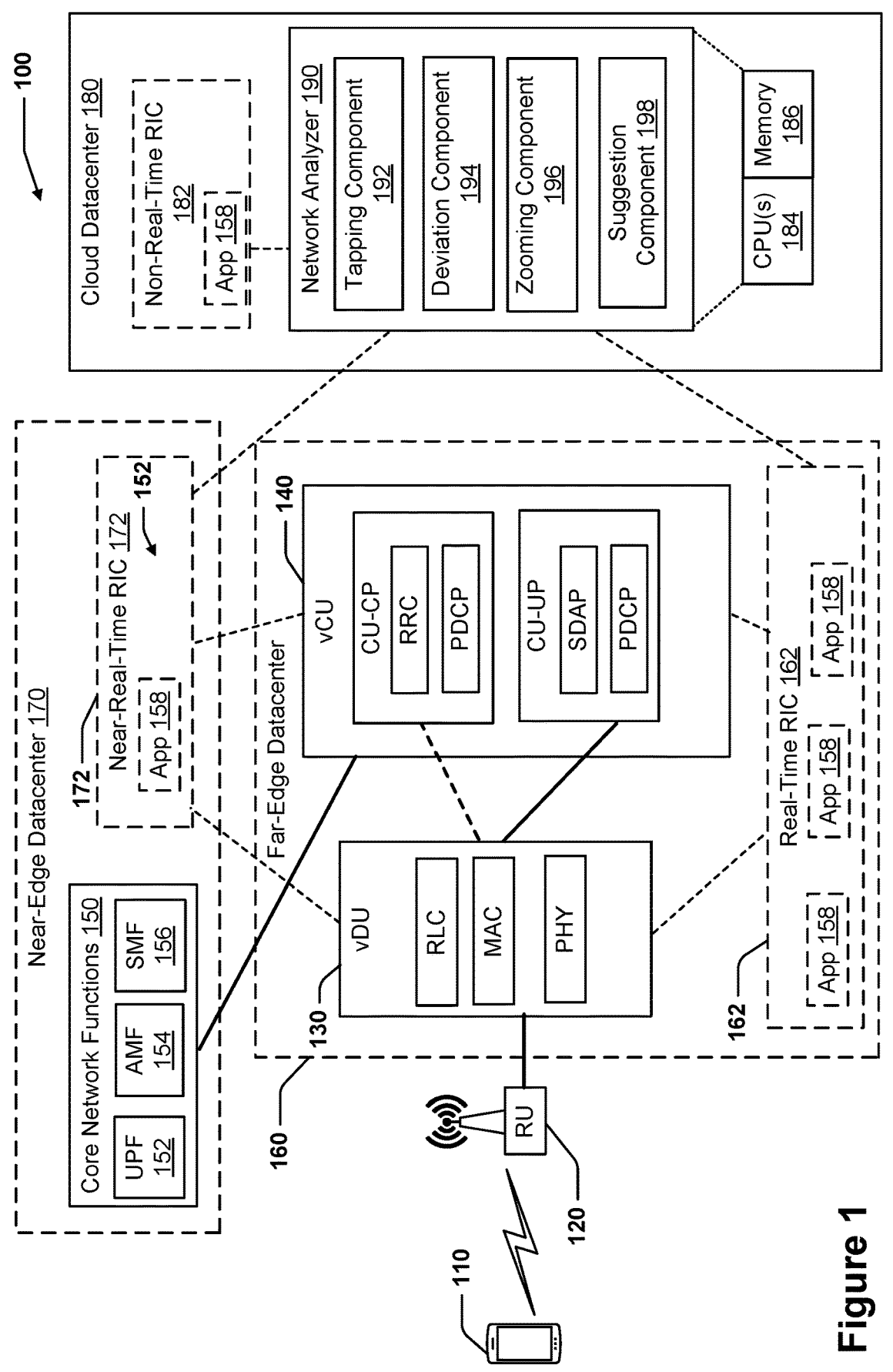
FIG. 1 is a diagram of an example virtualized radio access network (vRAN) that provides connectivity to a user equipment (UE).

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known components are shown in block diagram form in order to avoid obscuring such concepts.

This disclosure describes various examples related to a framework for machine-learning (ML)-based analytics and optimizations for radio access networks (RANs). A key transformation of the Radio Access Network (RAN) in 5G is the migration to an Open RAN architecture, that sees the 5G RAN virtualized and disaggregated across multiple open interfaces. For instance, the 3rd Generation Partnership Project (3GPP) publishes technical specifications defining 5G network. An open RAN architecture may be a non-proprietary version of such a network. This approach fosters innovation by allowing multiple vendors to come up with unique solutions for different components at a faster pace. Furthermore, a new component introduced in the Open RAN architecture called a Radio Intelligent Controller (RIC) allows third parties to build new, vendor-agnostic monitoring and optimization use cases over interfaces standardized by O-RAN.

A vRAN may include one or more RICs configured to provide additional analysis and control for the vRAN. In some implementations, basic or standardized functions of a RAN may be implemented as vRAN functions. The RIC may enhance, extend, or customize the vRAN functions. For example, a RIC may utilize artificial intelligence (AI) or machine-learning (ML) models to improve cost and performance of a vRAN via prediction, classification, and solving computationally intractable problems in RAN management. The RIC may collect information from various vRAN functions or hardware RAN network functions for providing analysis and control. In an aspect, RICs may be classified based on latency, which may in turn depend on geographic proximity to the RU. For example, RICs may include real-time RICs that are co-located with vRAN functions at a far-edge datacenter, near-real-time RICs that are located at a near-edge datacenter, and non-real time RICs that may be located at a near-edge datacenter or cloud datacenter.

Despite this compelling vision, the opportunity for innovation still largely remains untapped because of two main challenges. The first challenge is related to the flexible data collection for monitoring and telemetry applications. The RAN functions can generate huge volumes of telemetry data at a high frequency (e.g., gigabytes per second). Collecting, transferring, and processing this data can put a strain on compute and network capacity. A conventional approach, standardized by the 3rd generation partnership project (3GPP), defines a small set of aggregate cell key performance indicators (KPIs) collected every few seconds or minutes. The O-RAN RIC extends this idea by providing new KPIs at a finer time granularity. The O-RAN RIC may be classified as a near real-time RIC. Each KPI is defined through a service model (a form of API), most of them standardized by O-RAN.

The second challenge is due to an effect of a network issue being detected at a location remote from the cause. For example, a network issue may manifest to a user as a lack of a service or inability to access an application. Such issues could be due to a misconfiguration at any of the network nodes serving the user. Network analysts may analyze collected statistics to attempt to locate the cause (e.g., root cause analysis), but such analysis may only be performed when the effects become significant enough to warrant intervention by the network analysts. Accordingly, issues with smaller scope (e.g., affecting a small number of users) may go unresolved.

In 5G networking, it is challenging to develop and maintain software that can handle the complexity, dynamism, and error-proneness of the network. Managing the massive number of devices and connections that 5G networks enable requires efficient resource allocation, load balancing, and congestion control. Furthermore, monitoring and troubleshooting the network performance in real-time requires collecting and analyzing various metrics, such as number of packets, packet drops, latency, throughput, jitter, packet loss, and error rate. When these problems occur on a scale, it becomes extremely difficult to perform root cause analysis.

These challenges result in software bugs that cause packet drops, connection drops, session issues, and other problems that degrade the network performance and user experience. Therefore, there is a need for a solution that can make debugging as well as optimization scalable, faster, and efficient. In particular, in a telecommunications network where there are millions of subscribers running on core network platforms, a certain kind of traffic is blocked or degraded (e.g., an application) for thousands of users. Finding the actual reason for this blockage is challenging because debugging a single user in real-time is not available/feasible.

In an aspect, the present disclosure describes techniques for automatically analyzing network traffic in a communications network to identify and address potential performance issues. A machine-learning based network stage KPI analyzer taps existing module level statistics to provide meaningful information about the network. For example, the network analyzer may configure taps to collect a subset of module-level statistics from a plurality of network functions (NFs) within the network. The network analyzer analyzes the module-level statistics to identify a deviation from a normal state of operation for the network. The network analyzer identifies a network stage where a current network issue causes the deviation to occur using a machine learning model trained on features associated with the deviation. The network analyzer provides suggestions for debugging, optimizing, or testing the current network issue based on the deviation and the identified network stage.

Additionally, the network analyzer can zoom in on the identified network state by collecting additional module-level statistics or packet-level statistics at the identified network stage based on the deviation. These more detailed statistics can be used to confirm a suspected network issue before taking a corrective action to a NF at the network stage to address the issue.

Turning now to FIGS. 1-8, examples are depicted with reference to one or more components and one or more methods that may perform the actions or operations described herein, where components and/or actions/operations in dashed line may be optional. Although the operations described below in FIG. 7 are presented in a particular order and/or as being performed by an example component, the ordering of the actions and the components performing the actions may be varied, in some examples, depending on the implementation. Moreover, in some examples, one or more of the actions, functions, and/or described components may be performed by a specially-programmed processor, a processor executing specially-programmed software or computer-readable media, or by any other combination of a hardware component and a software component capable of performing the described actions or functions.

FIG. 1 is a diagram of an example vRAN 100 that provides connectivity to a user equipment (UE) 110. For example, the vRAN 100 may implement a 5G communications network. The vRAN 100 may include radio units 120 that transmit and receive wireless signals with the UE 110. The vRAN 100 may include a virtual distributed unit (vDU) 130 that performs processing, for example, at the physical (PHY) layer, media access control (MAC) layer, and radio link control (RLC) layer. The vRAN 100 may include a virtual central unit (vCU) 140 that performs processing at higher layers of the wireless protocol stack.

The division of functionality between the vDU 130 and the vCU 140 may depend on a functional split architecture. The vCU 140 may be divided into a central unit control plane (CU-CP) and central unit user plane (CU-UP). CU-UP may include the packet data convergence protocol (PDCP) layer and the service data adaptation (SDAP) layer, and the radio resource control (RRC) layer. Different components or layers may have different latency and throughput requirements. For example, the PHY layer may have latency requirements between 125 us and 1 ms and a throughput requirement greater than 1 Gbps, the MAC and RLC layers may have latency requirements between 125 us and 1 ms and a throughput requirement greater than 100 Mbps, and the higher layers at the vCU may have latency requirements greater than 125 us and a throughput requirement greater than 100 Mbps.

Higher layer network functions may be referred to as core network functions 150. For example, the core network functions may include one or more Access and Mobility Management Functions (AMFs), a Session Management Function (SMF), and a User Plane Function (UPF). These network functions may provide for management of connectivity of the UE 110. For example, the UPF may provide processing of user traffic to and from the Internet. For instance, a UPF may receive user traffic packets and forward the packets to a server via one or more routers using Internet protocol.

The vRAN 100 includes a RAN intelligent controller (RIC) that performs autonomous configuration and optimization of the vRAN 100. The RIC is implemented at multiple locations as at least a real-time RIC 162 and a near-real-time RIC 172 or a non-real-time RIC 182. For instance, the real-time RIC 162 is executed at a far-edge datacenter 160 that also executes a vRAN function such as the vDU 130 or the vCU 140. The near-real-time RIC 172 is executed at a near-edge datacenter 170. The non-real-time RIC 182 may be executed at either the near-edge datacenter 170 or a cloud datacenter 180. In an aspect, each datacenter is associated with a set of computing resources. For example, the computing resources at the far-edge datacenter 160 are a first set of computing resources and the computing resources at the near-edge datacenter 170 are a second set of computing resources.

Programmability in vRAN functions (e.g., Open RAN components) may be facilitated through the RIC. A network operator can install applications (Apps 158, e.g., xApps in Open RAN) on top of any of the real-time RIC 162. the near-real-time RIC 172, or the non-real-time RIC 182. Each RIC may collect network data and may leverage the network data to optimize network performance or report issues on a time-frame based on location. For example, a real-time RIC may operate with latency less than 10 milliseconds (ms); the near-real-time RIC 172 may operates with latency greater than 10 ms to seconds; and the non-real-time RIC 182 may operate with latency greater than 10 seconds. The RICs may obtain the network data from various sources. For example, the data collection and control of the vRAN components may be facilitated through service models that are embedded in the vRAN functions by vendors. The service models may explicitly define the type and frequency of data reporting for each App 158, as well as a list of control policies that the RIC can use to modify the RAN behavior. Such services models may collect significant network events occur at a relatively low rate (100s of ms to seconds), which is suitable for the near-real-time RIC 172 and the non-real-time RIC 182.

In an aspect, the present disclosure provides for a network analyzer 190 configured to analyze statistics collected from various network functions in order to identify and suggest responses to network issues. In some implementations, the network analyzer 190 may be implanted as an app 158 on a RIC. In other implementations, the network analyzer 190 may be implemented as a separate service, for example, as a service implemented on a cloud datacenter 180. In some implementations, the network analyzer 190 may be implemented as computer-executable code stored in a memory 186 that when executed by one or more processors (e.g., CPU(s) 184) performs the processes of the network analyzer 190, as described herein.

The network analyzer 190 includes a tapping component 192, a deviation component 194, a zooming component 196, and a suggestion component 198. The tapping component 192 is configured to collect a subset of module-level statistics from a plurality of network functions (NFs) within the network. The deviation component 194 is configured to analyze the module-level statistics to identify a deviation from a normal state of operation for the network. The zooming component 196 is configured to identify a network stage where a current network issue causes the deviation to occur using a machine learning model trained on features associated with the deviation. The suggestion component 198 is configured to provide suggestions for debugging, optimizing, or testing the current network issue based on the deviation and the identified network stage.

Figure 2:
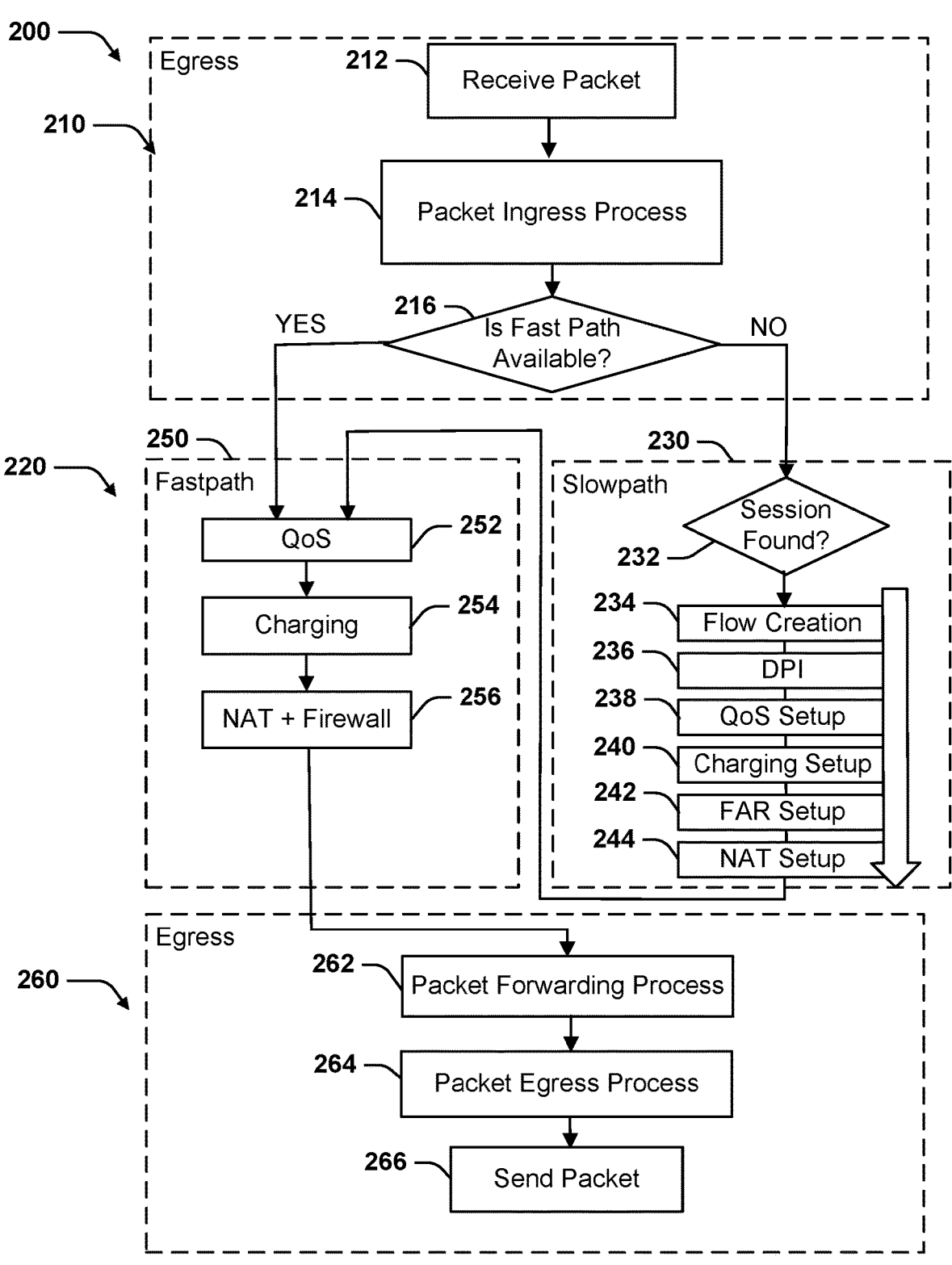
FIG. 2 is a diagram illustrating an example of packet processing at a network function.

FIG. 2 is a diagram 200 illustrating an example of packet processing at a network function. In some implementations, the network function may be a core network function such as the UPF 152, the AMF 154, or the SMF 156. A flow of a packet through the network function may include an ingress stage 210, a processing stage 220, and an egress stage 260. The processing stage 220 includes a networking slowpath 230 and fastpath 250.

The ingress stage 210 may include receiving the packet at block 212, extracting layer 2, 3, and 4 information at block 214, and determining whether the fastpath 250 is available for the packet at block 216. In the processing stage 220, the slowpath 230 may include session lookup at block 232, flow creation at block 234, deep packet inspection (DPI) at block 236, QoS setup at block 238, charging setup at block 240, field area router (FAR) setup at block 242, and NAT setup at block 244. The fastpath 250 may include quality of service (QOS) determination at block 252, charging at block 254, and NAT lookup and firewall policy lookup at block 256. The egress stage 260 includes a packet forwarding process 262 (e.g., route and forward), a packet egress process 264 (e.g., IP fragmentation), and sending the packet at block 266.

Figure 3:
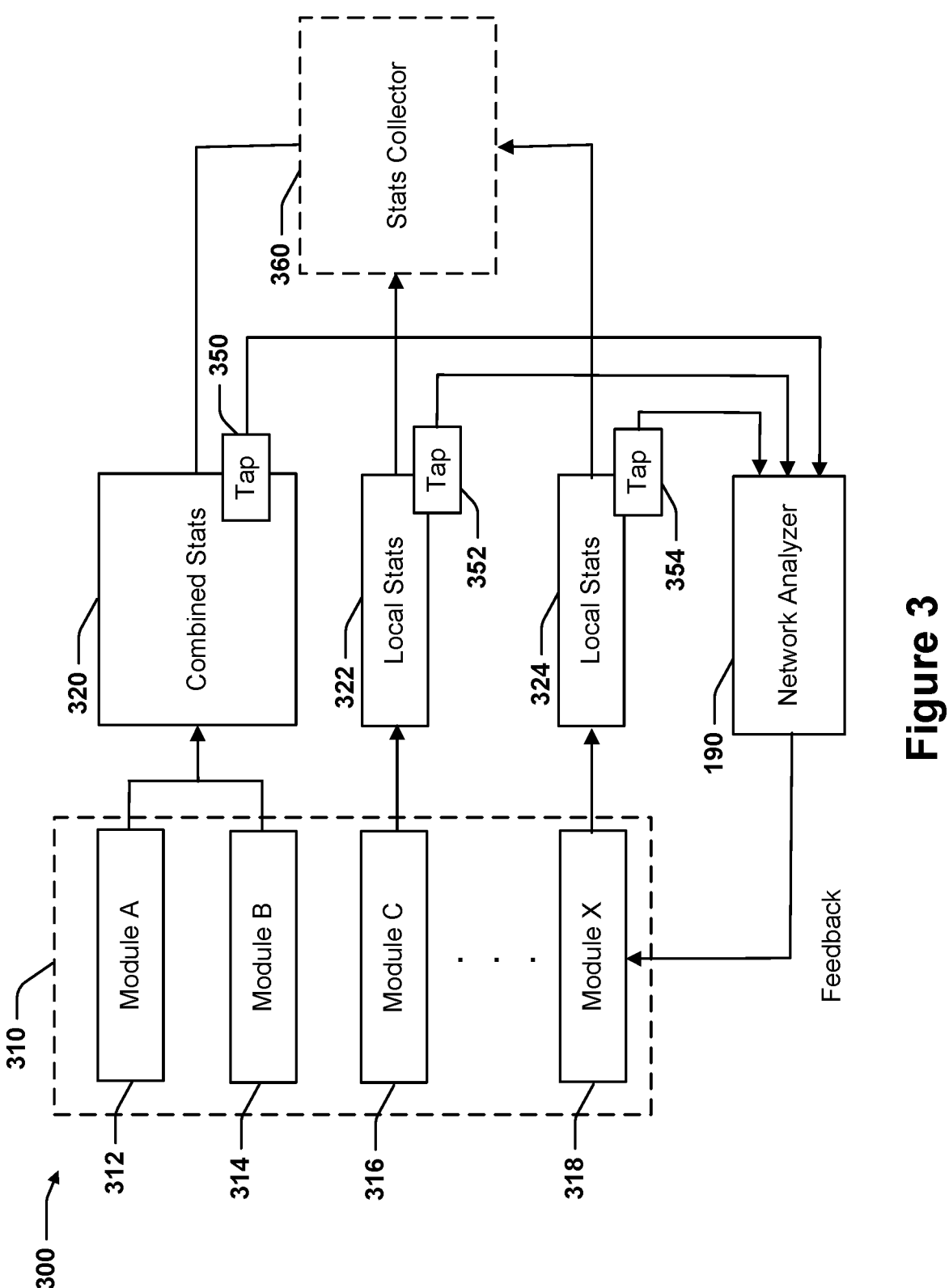
FIG. 3 is a diagram illustrating a soft tap for collecting network statistics for a network analyzer.

FIG. 3 is a diagram 300 illustrating a soft tap for collecting network statistics. A network 100 may be represented as a plurality of modules 310. For example, the modules 310 may correspond network functions such as the RU 120, the vDU 130, the vCU 140, and the core network functions 150 including the UPF 152, the AMF 154, and the SMF 156. Each module 310 is configured to report a stream of KPIs according to a service model. In some cases, the KPIs from multiple modules may be combined or aggregated. For example, a module 312 and a module 314 may be separate instances of a UPF 152 serving a region. The KPIs of the module 312 and the module 314 may be combined into combined statistics 320. Other modules (e.g., module 316 and module 318) may produce local statistics 322, 324 specific for a particular instance of a NF. In some conventional implementations, all of the statistics for the KPIs may be transmitted to a stats collector 360.

In an aspect, a soft tap 350, 352, or 354 may be configured to collect a subset of KPIs generated by modules 310 to the network analyzer 190. A subset of the KPIs refers to a set that is fewer than the generated KPIs in terms of number, granularity, or frequency. The configuration of the soft taps 350, 352, or 354 may be dynamic and may be adjusted by the network analyzer to analyze a suspected problem. For example, an initial configuration of the soft taps 350, 352, or 354 may collect a broad range of KPIs at a relatively low granularity that are selected to identify deviations in network performance. When a deviation is detected, the soft taps 350, 352, or 354 may be modified to increase the granularity or type of statistics collected. For example, when a module-level performance issue is detected (e.g., decreased throughput), the soft taps 350, 352, or 354 may be configured to provide packet-level statistics to determine a packet drop rate or common features of dropped packets.

Figure 4:
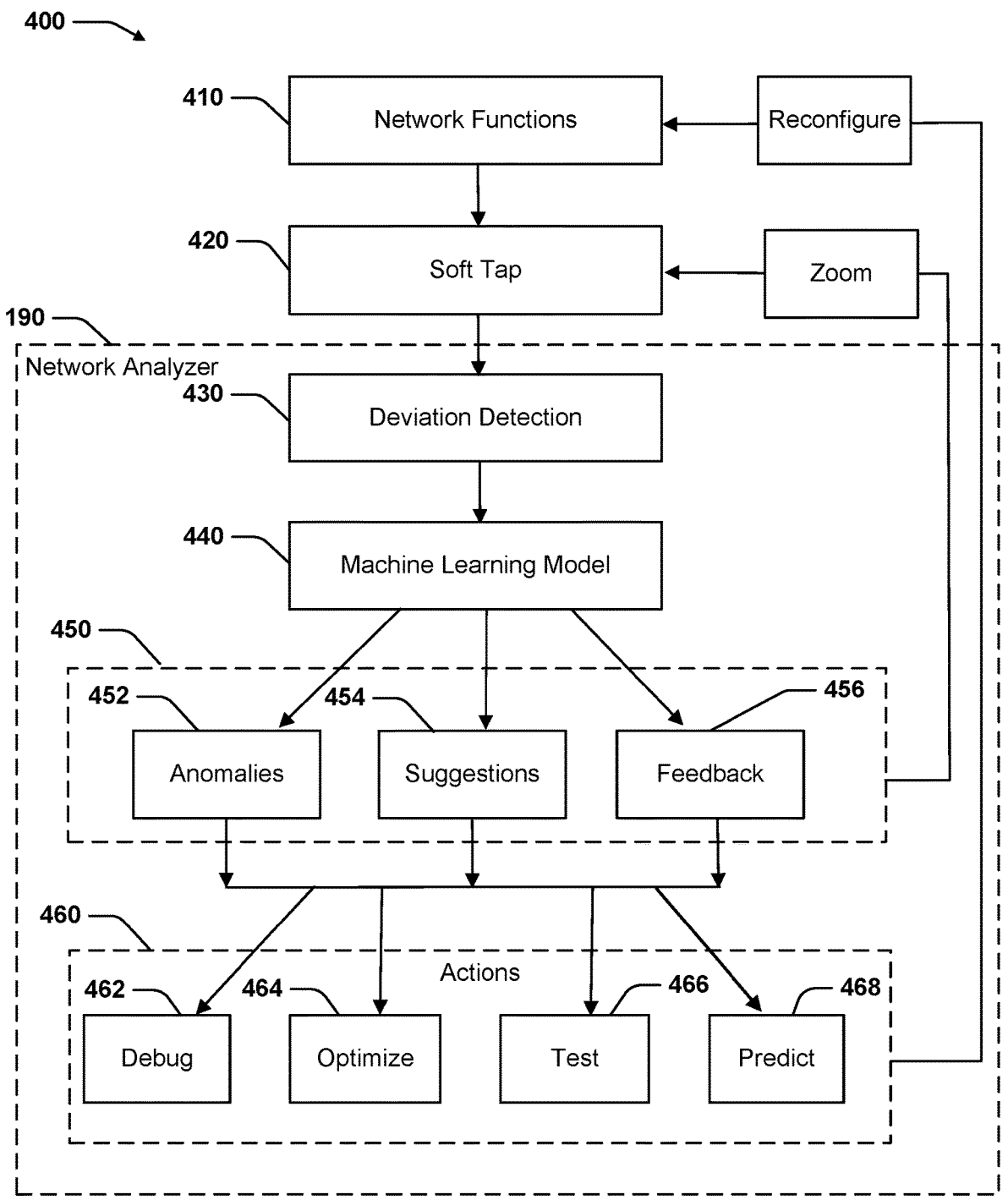
FIG. 4 is a diagram of an example workflow for addressing network issues by a network analyzer.

FIG. 4 is a diagram of an example flow 400 for addressing network issues. As discussed above, network functions (NFs) 410 process packets and generate statistics for KPIs according to a service model. The soft tap 420 collects a subset of those statistics to provide to the network analyzer 190.

The network analyzer 190 performs deviation detection 430. For example, the deviation component 194 may analyze the module-level statistics to identify a deviation from a normal state of operation for the network. For example, a deviation may include an anomaly where the module-level statistics are not consistent with a usual network state or a normal state of operation for the network. In some implementations, the deviation component 194 defines a normal state of operation for the network based on the module-level statistics during a first period of time. The deviation component 194 compares the module-level statistics during a second period of time to the defined normal state to identify the deviation.

There are several ways to determine if the network is working in the normal state. For example, a normal state may be defined by default module-level metrics such as packet arrival rate, flow rate, packet drops, number of packets per flow, etc. A default configuration of the soft taps

420 may collect these metrics. The normal state may be defined for a network function by applying statistical anomaly detection, time series analysis, and/or ML based approaches to these metrics. For example, NF information may include an NF type, configuration parameters, and resource utilization. Collected metrics may include information of packet flows through a pipeline at the NF including: packet count, byte count, flow count, port count, and address information. Path information may be learned from packets traversed before a deviation (e.g., dropped packets). Path information is generally consistent between packets, so details such as the processing timestamps at each discarding module may learned before the drop for a relatively small percentage of packets. For example, less than 1% of packets may be monitored to determine path information. Packet metadata including <src_ip, dst_ip, src_port, dst_port, protocol, network_context, interface, idle_time, etc.> may be associated with the normal state. Similarly, resource usage metrics for the resources that are consumed before the drop (CPU, memory, etc.) may define the normal network state. A deviation from the normal network state for any of the metrics may indicate a potential network issue.

A machine learning model 440 is trained to identify a network stage where a current network issue causes the deviation to occur. The machine learning model 440 is trained using the same features (i.e., metrics) that define the normal network state. The machine learning model 440 is trained to predict the specific module responsible for the traffic issues. In some implementations, the machine learning mode is a multi-class Support Vector Machine (SVM). Example multi-class SVMs include one-vs-rest, pairwise, etc. Further details of training the machine learning model 440 are discussed with respect to FIG. 5 below.

The trained machine learning model 440 predicts the responsible NF for new incoming data points (e.g., after a deviation). A general equation describing this method can be written as:

$$\text{prediction\_i} = \text{w\_i} * [f_1, f_2, f_3, \dots, f_n] + \text{b\_i}$$

where $f_j$ are the features (e.g., number of packets) related to the deviation for the network function i, w_i is the weight vector for the network function i learned by the machine learning model 440 during training. And b_i is the bias term for network function i learned by the machine learning model 440 during training.

In an aspect, the trained machine learning model 440 may output a network stage (e.g., an NF) likely to be causing the deviation. In some implementations, the network analyzer may zoom in on the identified network stage by configuring the soft taps 420 to collect additional information for the identified network stage. In some implementations, a type of deviation (e.g., which metric deviated from the normal state), may be associated with additional module-level of packet-level statistics for the network stage. For example, a deviation in the packet drop rate may be associated with a configuration that collects packet-level statistics for the NF identified by the machine learning model. In some implementations, the decision of whether to zoom on a particular NF may be based on a zooming score, which may be represented as:

$$\text{zooming\_score} = I \, (\text{metric} > \text{threshold}) * \text{weight}$$

where I(x) is an indicator function, which returns 1 if x is true and 0 otherwise, metric is a chosen metric value for the NF, threshold is a predefined threshold for zooming, and weight is a factor to adjust the score's significance. The zooming score may be summed over a plurality of metrics. If the zooming score is greater than a score threshold, the NF may be considered to be error prone, and zooming on the NF may be performed. The predicted NF can then be zoomed into for more information such as network logs, resource utilization, etc. The use of a zooming score helps prevent false alarms and unnecessary allocation of resources.

The machine learning model 440 may generate output 450 regarding a deviation. The output 450 may include an indication of the network stage where the current network issue causes the deviation to occur. The network stage may be indicated with a level of precision based on where a zooming process stops. For example, the network stage may be indicated as a type of NF, a specific instance of an NF, or a subset of traffic handled by the NF. In some implementations, the output 450 may include further information regarding the deviation such as anomalies 452, suggestions 454, or feedback 456. Anomalies may include a precise description of the deviation including the specific metrics that deviate from the normal state and an amount of the deviation. Suggestions 454 may include an area for manual investigation or a proposed change. For instance, if the network analyzer 190 identifies a common property of packets being dropped, the network analyzer 190 may suggest investigating a configuration of that property, or output relevant parts of NF configuration (e.g., applicable rules of a NAT configuration). Feedback 456 may include results of any automated attempts to address the network issue.

In some implementations, the network analyzer 190 may perform one or more actions 460 in response to outputs 450. For example, a debug action 462 may include executing a debugger application on a configuration. As another example, an optimize action 464 may include suggesting or setting a parameter such as a resource allocation. The test action 466 may include results indicating whether a change was successful. For example, the test action 466 may include a network trace of a ping packet. The predict action 468 may include generating simulated results for how a suggestion will impact performance.

Figure 5:
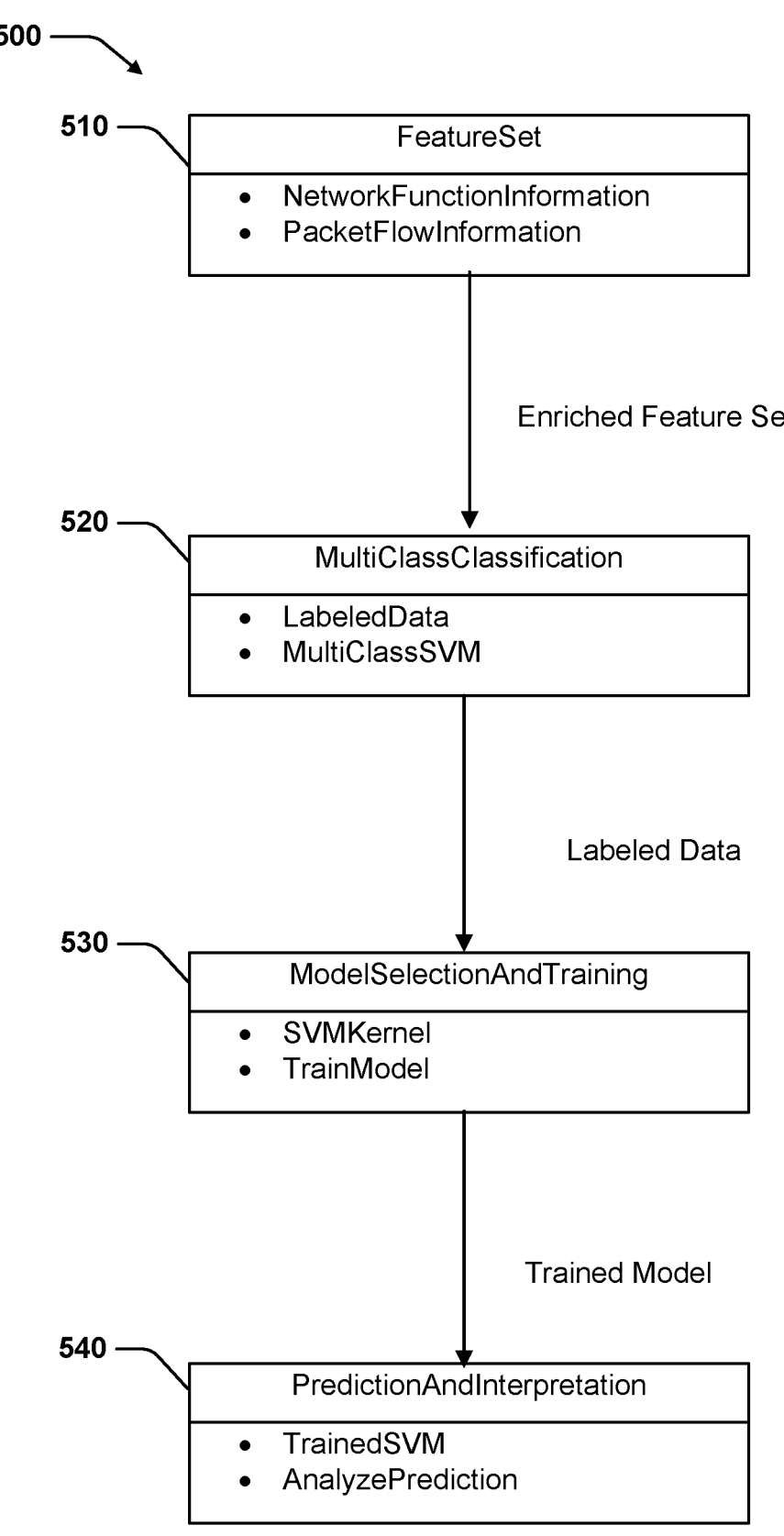
FIG. 5 is a flow diagram of an example process for training a machine learning model.

FIG. 5 is a flow diagram of an example process 500 for training a machine learning model. The process 500 may being with a feature set of performance metrics from a network function at block 510. The feature set may be enriched with network function information such as NF type, configuration parameters, and resource utilization. The feature set may also be enriched with packet flow information such as processing timestamps and metadata for a small subset of packets. At block 520, the enriched feature set may be labelled. In some implementations, the labels may be applied manually when a network issue is detected by network analysts. For instance, the label may include an identification of a network node where an issue was detected and/or corrected. The label may be associated with the performance metrics for a time period preceding the identification of the issue. At block 530, the labeled data is used to train the machine learning model 440. In some implementations, the machine learning model 440 is an SVM trained to predict a responsible NF based on a set of current network metrics. Because there are multiple NFs that may be responsible for a network issue, multi-class techniques are used to train the SVM. In block 540, the trained machine learning model 440 is used to predict a NF responsible for a current network issue. That is, after a deviation from the normal network state is detected, the current network metrics are provided to the machine learning model 440, which output one of the NFs in the network 100.

Figure 6:
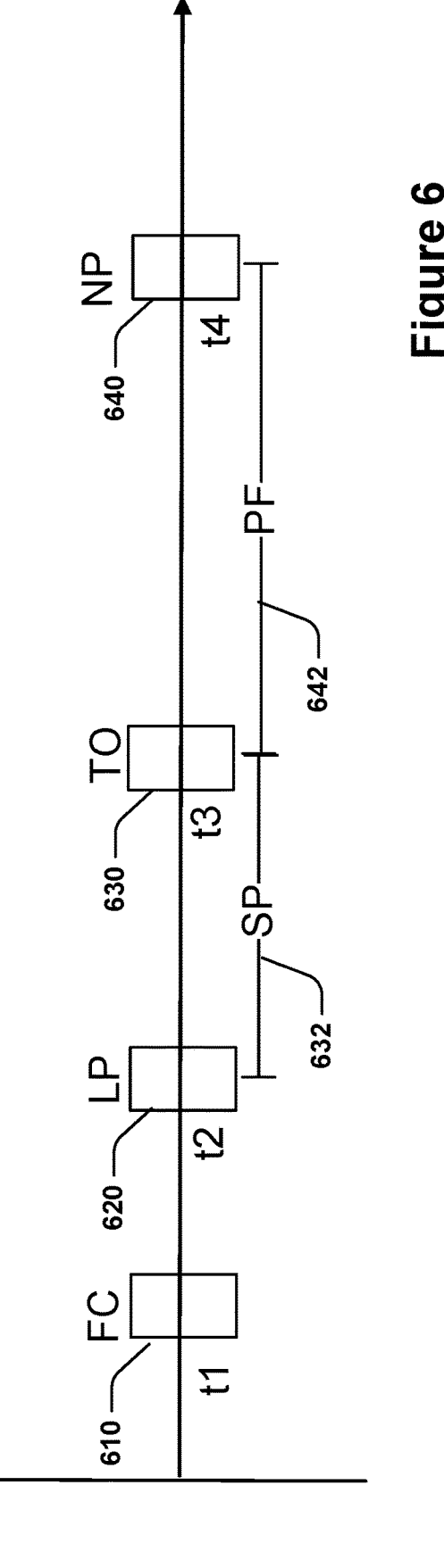
FIG. 6 is a timing diagram of an example network issue that can be corrected by the network analyzer.

FIG. 6 is a timing diagram 600 of an example network issue that can be corrected by the network analyzer 190. The network issue relates to configuration of a flow idle timeout that occurs when a flow does not receive any packets for a period of time. A previously detected flow may be saved and packets for the flow may be processed using the fastpath 250. If a timeout occurs, the flow is deleted and the next packet for the flow may be dropped due to lack of a NAT binding. There is a tradeoff between memory used to store potentially idle flows and processing time for packets to re-create a new flow.

For example, flow creation 610 occurs at time t1 when a received packet does not match an existing flow and is processed by the slowpath 230. A last packet 620 for the flow arrives at time t2. A timeout 630 occurs after a silence period 632. A next packet 640 is received at time t4 after a post flow duration 642.

In this example, the network analyzer 190 uses the machine learning model to detect and adjust the flow idle timeout. In a first step, the network starts dropping downstream packets due to lack of a NAT binding for the flow because the timeout 630 being set too low. Therefore, during the silence period 632, the timeout 630 occurs such that later received packets are dropped. The increase in drop rate may be detected as a deviation. The machine learning model 440 may identify the network function that is dropping packets. Zooming in on the network function may include tracking packet-level statistics such as transmission control protocol (TCP) timestamps of flows that became idle. The network analyzer 190 may calculate a delta between the timeout 630 and when a next downstream packet is received for the flows that became idle. If the delta is too large, the network analyzer 190 may suggest increasing the flow idle timeout for all the similar flows in bulk to solve the connectivity issue (i.e., dropped packets). If a ratio of the silence period 632 to the timeout 630 is too large, the network analyzer 190 may reduce the TO value in bulk for all the similar flows. Accordingly, resources for storing and processing flows may be optimized. In some implementations, the network analyzer 190 may recommend a configuration of a new idle time or actually change the configuration to set the idle time.

FIG. 7 is a flow diagram of an example of a method 700 for analyzing network traffic in a communications network. For example, the method 700 can be performed by a datacenter including one or more memories and one or more processors configured to execute the network analyzer 190. For instance, the network analyzer 190 may be instantiated on the cloud datacenter 180 or the near-edge datacenter 170.

At block 710, the method 700 includes collecting a subset of module-level statistics from a plurality of network functions (NFs) within the network. In an example, the cloud datacenter 180, e.g., in conjunction with one or more CPUs 184 or memory 186, can execute the network analyzer 190 and/or tapping component 192 to collect a subset of module-level statistics 320 from a plurality of NFs 410 within the network. In some implementations, the module-level statistics include packet-level statistics for a subset of packets processed by a network function. For instance, the subset of packets may be randomly sampled as a percentage of packets traversing the network function or may be selected based on packet properties.

At block 720, the method 700 includes analyzing the module-level statistics to identify a deviation from a normal state of operation for the network. In an example, the cloud datacenter 180, e.g., in conjunction with one or more CPUs 184 or memory 186, can execute the network analyzer 190 and/or deviation component 194 to analyze the module-level statistics to identify a deviation from a normal state of operation for the network. For instance, at sub-block 722, the block 720 may optionally include defining a normal state of operation for the network based on the module-level statistics during a first period of time. Defining the normal state of operation for the network may optionally include using statistical anomaly detection, time series analysis, or machine learning techniques. At sub-block 724, the block 720 may optionally include comparing the module-level statistics during a second period of time to the defined normal state to identify the deviation.

At block 730, the method 700 may optionally include training a multi-class SVM model to predict a specific NF responsible for the network issue based on analyzed statistics including features captured before and after identified network issues. In an example, the cloud datacenter 180, e.g., in conjunction with one or more CPUs 184 or memory 186, can execute the network analyzer 190 and/or zooming component 196 to train a multi-class SVM model to predict a specific NF responsible for the network issue based on analyzed statistics including features captured before and after identified network issues.

At block 740, the method 700 includes identifying a network stage where a current network issue causes the deviation to occur using a machine learning model trained on features associated with the deviation. In an example, the cloud datacenter 180, e.g., in conjunction with one or more CPUs 184 or memory 186, can execute the network analyzer 190 and/or zooming component 196 to identify a network stage where a current network issue causes the deviation to occur using a machine learning model 440 trained on features associated with the deviation. For instance, the network stage may be a type of NF or a specific instance of an NF. For example, in sub-block 742, the machine learning model 440 may be the SVM trained in block 730, and the block 740 may include using the trained SVM model to predict a specific NF that is responsible for the current network issue based on features of the module-level statistics associated with the deviation. As another example, in sub-block 744, the block 740 may optionally include calculating a zooming score for each respective NF of the plurality of NFs based on module-level statistics associated with the respective NF. In sub-block 746, the block 740 may optionally include identifying the respective NF as error-prone if the zooming score for the respective NF exceeds a predefined threshold.

At block 750, the method 700 may optionally include collecting additional module-level statistics or packet-level statistics at the identified network stage based on the deviation. In an example, the cloud datacenter 180, e.g., in conjunction with one or more CPUs 184 or memory 186, can execute the network analyzer 190 and/or the zooming component 196 to collect additional module-level statistics or packet-level statistics at the identified network stage based on the deviation. For instance, the zooming component 196 may configure the taps 350, 352, 354 to provide the additional statistics. In some implementations, the zooming component 196 is configured to execute the block 750 in response to determining that the identified NF is considered error-prone in sub-block 746.

At block 760, the method 700 may optionally include confirming the network issue based on the additional module-level statistics or packet-level statistics. In an example, the cloud datacenter 180, e.g., in conjunction with one or more CPUs 184 or memory 186, can execute the network analyzer 190 and/or suggestion component 198 to confirm the network issue based on the additional module-level statistics or packet-level statistics.

At block 770, the method 700 includes providing suggestions for debugging, optimizing, or testing the current network issue based on the deviation and the identified network stage. In an example, the cloud datacenter 180, e.g., in conjunction with one or more CPUs 184 or memory 186, can execute the network analyzer 190 and/or suggestion component 198 to provide suggestions for debugging, optimizing, or testing the current network issue based on the deviation and the identified network stage.

At block 780, the method 700 may optionally include taking corrective action to an NF at the network stage to address the network issue. In an example, the cloud datacenter 180, e.g., in conjunction with one or more CPUs 184 or memory 186, can execute the network analyzer 190 and/or suggestion component 198 to take corrective action 460 to an NF 410 at the network stage to address the network issue.

Figure 8:
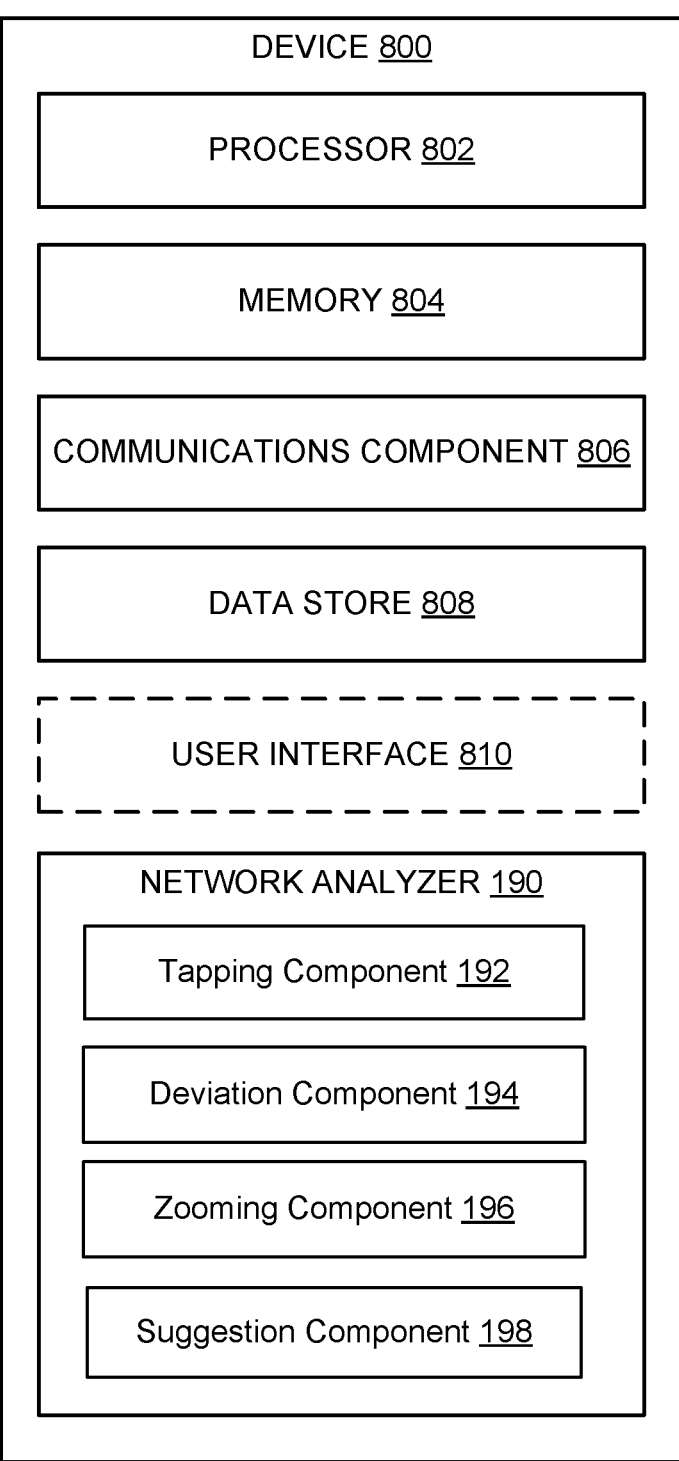
FIG. 8 illustrates an example of a device including additional optional component details as those shown in FIG. 1.

FIG. 8 illustrates an example of a device 800 including additional optional component details as those shown in FIG. 2. In one aspect, device 800 may include one or more processors 802, which may be similar to CPU(s) 184 for carrying out processing functions associated with one or more of components and functions described herein. Processor(s) 802 can include a single or multiple set of processors or multi-core processors. Moreover, processor(s) 802 can be implemented as an integrated processing system and/or a distributed processing system.

Device 800 may further include one or more memory/memories 804, which may be similar to memory 186 such as for storing local versions of operating systems (or components thereof) and/or applications being executed by processor(s) 802, such as network analyzer 180. Memory/memories 804 can include a type of memory usable by a computer, such as random access memory (RAM), read only memory (ROM), tapes, magnetic discs, optical discs, volatile memory, non-volatile memory, and any combination thereof.

Further, device 800 may include a communications component 806 that provides for establishing and maintaining communications with one or more other devices, parties, entities, etc. utilizing hardware, software, and services as described herein. Communications component 806 may carry communications between components on device 800, as well as between device 800 and external devices, such as devices located across a communications network and/or devices serially or locally connected to device 800. For example, communications component 806 may include one or more buses, and may further include transmit chain components and receive chain components associated with a wireless or wired transmitter and receiver, respectively, operable for interfacing with external devices.

Additionally, device 800 may include a data store 808, which can be any suitable combination of hardware and/or software, that provides for mass storage of information, databases, and programs employed in connection with aspects described herein. For example, data store 808 may be or may include a data repository for operating systems (or components thereof), applications, related parameters, etc. not currently being executed by processor(s) 802. In addition, data store 808 may be a data repository for non-real-time RIC 182, network analyzer 190, and/or one or more other components of the device 800.

Device 800 may optionally include a user interface component 810 operable to receive inputs from a user of device 800 and further operable to generate outputs for presentation to the user. User interface component 810 may include one or more input devices, including but not limited to a keyboard, a number pad, a mouse, a touch-sensitive display, a navigation key, a function key, a microphone, a voice recognition component, a gesture recognition component, a depth sensor, a gaze tracking sensor, a switch/button, any other mechanism capable of receiving an input from a user, or any combination thereof. Further, user interface component 810 may include one or more output devices, including but not limited to a display, a speaker, a haptic feedback mechanism, a printer, any other mechanism capable of presenting an output to a user, or any combination thereof.

Device 800 may additionally include the network analyzer 190 including the tapping component 192, the deviation component 194, and the suggestion component 198 as described herein.

The following numbered clauses provide an overview of aspects of the present disclosure:

Clause 1. An apparatus for analyzing network traffic in a 5G network, comprising: one or more memories storing computer-executable instructions; and one or more processors configured to execute the instructions to: collect a subset of module-level statistics from a plurality of network functions (NFs) within the network; analyze the module-level statistics to identify a deviation from a normal state of operation for the network; identify a network stage where a current network issue causes the deviation to occur using a machine learning model trained on features associated with the deviation; collect additional module-level statistics or packet-level statistics at the identified network stage based on the deviation; and provide suggestions for debugging, optimizing, or testing the current network issue based on the deviation and the identified network stage.

Clause 2. The apparatus of clause 1, wherein the one or more processors, individually or in combination, are configured to: confirm the network issue based on the additional module-level statistics or packet-level statistics; and take corrective action to an NF at the network stage to address the network issue.

Clause 3. The apparatus of clause 1 or 2, wherein the module-level statistics include packet-level statistics for a subset of packets processed by the network function.

Clause 4. The apparatus of any of clauses 1-3, wherein to identify the deviation from the typical behavior, the one or more processors, individually or in combination, are configured to: define the normal state of operation for the network based on the module-level statistics during a first period of time; and compare the module-level statistics during a second period of time to the defined normal state to identify the deviation.

Clause 5. The apparatus of clause 4, wherein to define the normal state of operation for the network, the one or more processors, individually or in combination are configured to use statistical anomaly detection, time series analysis, or machine learning techniques.

Clause 6. The apparatus of any of clauses 1-5, wherein the machine learning model is a multi-class Support Vector Machine (SVM) model, and the one or more processors, individually or in combination are configured to: train the multi-class SVM model to predict a specific NF responsible for the network issue based on analyzed statistics including features captured before and after identified network issues; and use the trained SVM model to predict a specific NF that is responsible for the current network issue based on features of the module-level statistics associated with the deviation.

Clause 7. The apparatus of clause 6, wherein the SVM model is a one-vs-rest or pairwise multi-class SVM.

Clause 8. The apparatus of any of clauses 1-7, wherein to identify the network stage, the one or more processors, individually or in combination are configured to: calculate a zooming score for each respective NF of the plurality of NFs based on module-level statistics associated with the respective NF; and identify the respective NF as error-prone if the zooming score for the respective NF exceeds a predefined threshold.

Clause 9. The apparatus of clause 8, wherein the zooming score is calculated using a formula comprising an indicator function, a chosen metric value, a predefined threshold, and a weight factor.

Clause 10. A method for analyzing network traffic in a communications network, comprising: collecting a subset of module-level statistics from a plurality of network functions (NFs) within the network; analyzing the module-level statistics to identify a deviation from a normal state of operation for the network; identifying a network stage where a current network issue causes the deviation to occur using a machine learning model trained on features associated with the deviation; collecting additional module-level statistics or packet-level statistics at the identified network stage based on the deviation; and providing suggestions for debugging, optimizing, or testing the current network issue based on the deviation and the identified network stage.

Clause 11. The method of clause 10, further comprising: confirming the network issue based on the additional module-level statistics or packet-level statistics; and taking corrective action to an NF at the network stage to address the network issue.

Clause 12. The method of clause 10 or 11, wherein the module-level statistics include packet-level statistics for a subset of packets.

Clause 13. The method of any of clauses 10-12, wherein analyzing the module-level statistics comprises: defining a normal state of operation for the network based on the module-level statistics during a first period of time; and comparing the module-level statistics during a second period of time to the defined normal state to identify the deviation.

Clause 14. The method of clause 13, wherein defining the normal state of operation for the network comprises using statistical anomaly detection, time series analysis, or machine learning techniques.

Clause 15. The method of any of clauses 10-14, wherein the machine learning model is a multi-class Support Vector Machine (SVM) model, the method further comprising: training the multi-class SVM model to predict a specific NF responsible for the network issue based on analyzed statistics including features captured before and after identified network issues; and using the trained SVM model to predict a specific NF that is responsible for the current network issue based on features of the module-level statistics associated with the deviation.

Clause 16. The method of clause 15, wherein the SVM model is a one-vs-rest or pairwise multi-class SVM.

Clause 17. The method of any of clauses 10-16, wherein identifying the network stage comprises: calculating a zooming score for each respective NF of the plurality of NFs based on module-level statistics associated with the respective NF; and identifying the respective NF as error-prone if the zooming score for the respective NF exceeds a predefined threshold.

Clause 18. The method of clause 17, wherein the zooming score is calculated using a formula comprising an indicator function, a chosen metric value, a predefined threshold, and a weight factor.

Clause 19. A non-transitory computer-readable medium storing computer-executable code that when executed by one or more processors causes the one or more processors to: collect a subset of module-level statistics from a plurality of network functions (NFs) within the network; analyze the module-level statistics to identify a deviation from a normal state of operation for the network; identify a network stage where a current network issue causes the deviation to occur using a machine learning model trained on features associated with the deviation; collect additional module-level statistics or packet-level statistics at the identified network stage based on the deviation; and provide suggestions for debugging, optimizing, or testing the current network issue based on the deviation and the identified network stage.

Clause 20. The non-transitory computer-readable medium of clause 19, further comprising code to: confirm the network issue based on the additional module-level statistics or packet-level statistics; and take corrective action to an NF at the network stage to address the network issue.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more aspects, one or more of the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), and floppy disk where disks usually reproduce data magnetically, while discs reproduce data optically with lasers. Combinations of the above should also be included within the scope of computer-readable media. Non-transitory computer readable media specifically exclude transitory signals.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the claim language. Reference to an element in the singular is not intended to mean "one and only one" unless specifically so stated, but rather "one or more." Unless specifically stated otherwise, the term "some" refers to one or more. Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. An apparatus for analyzing network traffic in a 5G network, comprising:
   one or more memories storing computer-executable instructions; and
   one or more processors configured to execute the instructions to:
   collect a subset of module-level statistics from a plurality of network functions (NFs) within the network;
   analyze the subset of module-level statistics to identify a deviation from a normal state of operation for the network, wherein to identify the deviation from the normal state of operation, the one or more processors, individually or in combination, are configured to:
   define the normal state of operation for the network based on the module-level statistics during a first period of time; and
   compare the module-level statistics during a second period of time to the defined normal state to identify the deviation;
   identify a network stage where a current network issue causes the deviation to occur using a machine learning model trained on features associated with the deviation;
   collect additional module-level statistics or packet-level statistics at the identified network stage based on the deviation; and
   provide suggestions for debugging, optimizing, or testing the current network issue based on the deviation and the identified network stage.

2. The apparatus of claim 1, wherein the one or more processors, individually or in combination, are configured to:
   confirm the network issue based on the additional module-level statistics or packet-level statistics; and
   take corrective action to an NF at the network stage to address the current network issue.

3. The apparatus of claim 1, wherein the module-level statistics include packet-level statistics for a subset of packets processed by a network function.

4. The apparatus of claim 1, wherein to define the normal state of operation for the network, the one or more processors, individually or in combination are configured to use statistical anomaly detection, time series analysis, or machine learning techniques.

5. The apparatus of claim 1, wherein the machine learning model is a multi-class Support Vector Machine (SVM) model, and the one or more processors, individually or in combination are configured to:

train the multi-class SVM model to predict a specific NF responsible for the network issue based on analyzed statistics including features captured before and after identified network issues; and use the trained SVM model to predict a specific NF that is responsible for the current network issue based on features of the module-level statistics associated with the deviation.

6. The apparatus of claim 5, wherein the SVM model is a one-vs-rest or pairwise multi-class SVM.

7. The apparatus of claim 1, wherein to identify the network stage, the one or more processors, individually or in combination are configured to:

calculate a zooming score for each respective NF of the plurality of NFs based on module-level statistics associated with the respective NF; and identify the respective NF as error-prone if the zooming score for the respective NF exceeds a predefined threshold.

8. The apparatus of claim 7, wherein the zooming score is calculated using a formula comprising an indicator function, a chosen metric value, a predefined threshold, and a weight factor.

9. A method for analyzing network traffic in a communications network, comprising:

collecting a subset of module-level statistics from a plurality of network functions (NFs) within the network;

analyzing the module-level statistics to identify a deviation from a normal state of operation of the network, wherein identifying the deviation from the normal state of operation comprises:

defining the normal state of operation for the network based on the module-level statistics during a first period of time; and comparing the module-level statistics during a second period of time to the defined normal state to identify the deviation;

identifying a network stage where a current network issue causes the deviation to occur using a machine learning model trained on features associated with the deviation;

collecting additional module-level statistics or packet-level statistics at the identified network stage based on the deviation; and providing suggestions for debugging, optimizing, or testing the current network issue based on the deviation and the identified network stage.

10. The method of claim 9, further comprising:

confirming the network issue based on the additional module-level statistics or packet-level statistics; and taking corrective action to an NF at the network stage to address the current network issue.

11. The method of claim 9, wherein the module-level statistics include packet-level statistics for a subset of packets processed by a network function.

12. The method of claim 9, wherein defining the normal state of operation for the network comprises using statistical anomaly detection, time series analysis, or machine learning techniques.

13. The method of claim 9, wherein the machine learning model is a multi-class Support Vector Machine (SVM) model, the method further comprising:

training the multi-class SVM model to predict a specific NF responsible for the network issue based on analyzed statistics including features captured before and after identified network issues; and using the trained SVM model to predict a specific NF that is responsible for the current network issue based on features of the module-level statistics associated with the deviation.

14. The method of claim 13, wherein the SVM model is a one-vs-rest or pairwise multi-class SVM.

15. The method of claim 9, wherein identifying the network stage comprises:

calculating a zooming score for each respective NF of the plurality of NFs based on module-level statistics associated with the respective NF; and identifying the respective NF as error-prone if the zooming score for the respective NF exceeds a predefined threshold.

16. The method of claim 15, wherein the zooming score is calculated using a formula comprising an indicator function, a chosen metric value, a predefined threshold, and a weight factor.

17. A non-transitory computer-readable medium storing computer-executable code that when executed by one or more processors causes the one or more processors to:

collect a subset of module-level statistics from a plurality of network functions (NFs) within the network;

analyze the module-level statistics to identify a deviation from a normal state of operation of the network, wherein the code to identify the deviation from the normal state of operation comprises code to:

define the normal state of operation for the network based on the module-level statistics during a first period of time; and compare the module-level statistics during a second period of time to the defined normal state to identify the deviation;

identify a network stage where a current network issue causes the deviation to occur using a machine learning model trained on features associated with the deviation;

collect additional module-level statistics or packet-level statistics at the identified network stage based on the deviation; and provide suggestions for debugging, optimizing, or testing the current network issue based on the deviation and the identified network stage.

18. The non-transitory computer-readable medium of claim 17, further comprising code to:

confirm the network issue based on the additional module-level statistics or packet-level statistics; and take corrective action to an NF at the network stage to address the network issue.

* * * * *